United States Patent
Matsuzawa

(10) Patent No.: US 8,508,769 B2
(45) Date of Patent: Aug. 13, 2013

(54) SYSTEM AND METHOD FOR SAVING AND RESTORING A SETTING FROM AN INTERRUPTED PROCESS

(75) Inventor: Noriko Matsuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1313 days.

(21) Appl. No.: 12/264,837

(22) Filed: Nov. 4, 2008

(65) Prior Publication Data

US 2009/0116052 A1    May 7, 2009

(30) Foreign Application Priority Data

Nov. 5, 2007  (JP) ................................ 2007-287639

(51) Int. Cl.
*H04N 1/64*  (2006.01)

(52) U.S. Cl.
USPC ........ 358/1.15; 358/1.14; 358/1.16; 358/501; 358/505; 358/401; 358/437; 358/448

(58) Field of Classification Search
None
See application file for complete search history.

(56) References Cited

U.S. PATENT DOCUMENTS

| | | | | |
|---|---|---|---|---|
| 6,809,836 B1 * | 10/2004 | Nobuta et al. | ........... | 358/1.9 |
| 7,139,102 B2 * | 11/2006 | Minato | ........... | 358/3.07 |
| 8,291,262 B2 * | 10/2012 | Tsujimoto | ........... | 714/18 |
| 2002/0027675 A1 * | 3/2002 | Minato | ........... | 358/1.15 |
| 2004/0145776 A1 * | 7/2004 | Azami | ........... | 358/1.15 |
| 2006/0044593 A1 * | 3/2006 | Kawakami et al. | ........... | 358/1.14 |
| 2006/0109498 A1 * | 5/2006 | Ferlitsch | ........... | 358/1.15 |
| 2006/0268310 A1 * | 11/2006 | Tamai et al. | ........... | 358/1.14 |
| 2006/0274373 A1 * | 12/2006 | Niitsuma | ........... | 358/1.16 |
| 2006/0291005 A1 * | 12/2006 | Genda | ........... | 358/474 |
| 2007/0076271 A1 * | 4/2007 | Shirai | ........... | 358/498 |
| 2008/0304104 A1 * | 12/2008 | Hirama | ........... | 358/1.15 |
| 2009/0034847 A1 * | 2/2009 | Hirohata et al. | ........... | 382/190 |

FOREIGN PATENT DOCUMENTS

| | | |
|---|---|---|
| JP | 08-237403 | 9/1996 |
| JP | 2005-011232 | 1/2005 |
| JP | 2006-099725 A | 4/2006 |

* cited by examiner

*Primary Examiner* — King Poon
*Assistant Examiner* — Beniyam Menberu
(74) *Attorney, Agent, or Firm* — Carter, DeLuca, Farrell & Schmidt LLP

(57) ABSTRACT

In one version of a system according to the present invention, an MFP device and a storage server are connected to each other via a network. A user authentication is performed to acquire user information. Job information associated with the user information is acquired from the storage server. When scanning or printing is interrupted, scan or print setting information set before the interruption, and optionally the image data scanned before the interruption, are acquired. The MFP device performs the scanning or printing based on the setting information acquired from the storage server at the time of restart.

13 Claims, 9 Drawing Sheets

EXAMPLE OF SCAN
INTERRUPTION INSTRUCTION UI

EXAMPLE OF SAVING
INSTRUCTION UI AT OCCURRENCE OF ERROR

EXAMPLE OF JOB SELECTION UI

SYSTEM AND METHOD FOR SAVING AND RESTORING A SETTING FROM AN INTERRUPTED PROCESS

BACKGROUND OF THE INVENTION

1. Field of the Invention

The present invention generally relates to a system and a method for saving the setting of an interrupted scanning or printing process in a storage server connected via a LAN and/or the Internet, and then restoring the setting when restarting the scanning or printing process.

2. Description of the Prior Art

Recent reinforced IT environments and improved security have made it possible to securely treat information about individual users. As a result, more storage services that use networks such as the Internet have been provided, not only in offices, but also in public environments such as convenience stores. Accordingly, a user can save a document scanned in a convenience store as image data in a storage server and refer to the data in an office or at home. In addition, a file (including image data, text document, and the like) saved in a storage server in an office or at home can be printed at a convenience store.

However, when scanning is interrupted, the user may have to start the scanning again from the first page, or scan the remaining pages and then merge two files (scanned documents before and after the interruption, respectively) into one file. Regarding the case where the scanning is interrupted partway, Japanese Patent Laid-Open No. 8-237403 describes a technique in which image data obtained by the partial scan and remaining data obtained by the later scan are treated as one data set.

Japanese Patent Laid-Open No. 2005-11232 discloses that printing can be performed by saving print setting parameters as one job associated with print target data in a local storage region of a printer and then specifying the job.

As described above, according to Japanese Patent Laid-Open No. 8-237403, when the user interrupts scanning, the image data can be treated as one data set. However, in the technique described in Japanese Patent Laid-Open No. 8-237403, the image data obtained by a second scan processing may have different scan settings, such as resolution, color specification of monochrome or color, size specification of the document file, and reading density. Thus, a file including unified data typically cannot be created unless the user checks the data with such intention.

In the technique described in Japanese Patent Laid-Open No. 2005-11232, the scan setting or print setting at the time of interruption cannot be shared with other scanners or printers even if saved, since the destination for saving the setting is the local storage region of the scanner or printer.

SUMMARY OF THE INVENTION

Aspects of the present invention may relate to a system and a method that can improve user convenience even when an image reading process or an image printing process is interrupted.

In the first aspect of the present invention, a system is provided that includes an image processing device capable of executing image processing including at least one of image reading processing and image printing processing, and an information processing device connected to the image processing device via a network. The image processing device includes a unit configured to perform user authentication to acquire user information; a unit configured to acquire setting information that is associated with the user information from the information processing device; a unit configured to interrupt the image processing; and a unit configured to acquire setting information on the image processing that is set before interruption occurs. The image processing device also includes a unit configured to transmit, to the information processing device, the setting information set before the interruption occurs and the user information associated with the setting information. The information processing device includes a saving unit configured to save the setting information set before the interruption occurs and the user information associated with the setting information in association with each other, when the information processing device receives the setting information set before the interruption and the user information associated with the setting information from the image processing device; and a unit configured to extract the setting information associated with the user information from the saving unit, and a unit configured to transmit the extracted setting information to the image processing device, when the information processing device receives the user information and an acquisition request for the setting information from the image processing device. The image processing device performs image processing based on the setting information acquired from the information processing device at a time of a restart of the interrupted image processing.

In a second aspect of the present invention, a system is provided that includes an image processing device capable of executing image reading processing, and an information processing device connected to the image processing device via a network. The image processing device includes a unit configured to perform user authentication to acquire user information; a unit configured to acquire first scan setting information that is associated with the user information from the information processing device; a unit configured to interrupt the image reading processing; a unit configured to acquire second scan setting information on the image reading processing that is set before interruption occurs and scanned image data scanned before interruption occurs. The image processing device also includes a unit configured to transmit, to the information processing device, the second scan setting information, the scanned image data, and the user information associated with the second scan setting information. The information processing device includes a saving unit configured to save the second scan setting information and the scanned image data as a job in association with the user information associated with the second scan setting information, when the information processing device receives the second scan setting information, the scanned image data, and the user information associated with the second scan setting information from the image processing device. The information processing device also includes a unit configured to extract the first scan setting information by referencing the job, and a unit configured to transmit the extracted first scan setting information to the image processing device, when the information processing device receives the user information and an acquisition request for the first scan setting information from the image processing device. The image processing device performs the image reading processing based on the first scan setting information acquired from the information processing device at a time of a restart of the interrupted image reading processing In a third aspect of the present invention, a system is provided that includes an image processing device capable of executing image printing processing, and an information processing device connected to the image processing device via a network. The image processing device includes a unit configured to perform user authentication to acquire user information; a first acquiring unit configured to acquire first print setting information that is associated with the user information from the information processing device; a unit configured to acquire image data to be printed; a unit configured to perform the image printing processing based on the image data to be printed; a unit configured to interrupt the image printing processing; and a second acquiring unit configured to acquire second print setting information on the image printing processing that is set before the interruption. The image processing device also includes a transmission unit configured to transmit, to the information processing device, the second print setting information and user information associated with the second print setting information. The information processing device includes a saving unit configured to save the second print setting information as a job in association with the user information associated with the second print setting information, when the information processing device receives the second print setting information and the user information associated with the second print setting information from the image processing device, a unit configured to extract the first print setting information by referencing to the job, and a transmission unit configured to transmit the extracted first print setting information to the image processing device, when the information processing device receives the user information and an acquisition request for the first print setting information from the image processing device. The image processing device performs the image printing processing based on the first print setting information acquired from the information processing device and based on the image data to be printed at a time of a restart of the interrupted image printing processing.

Further features of the present invention will become apparent from the following description of exemplary embodiments, with reference to the attached drawings.

DESCRIPTION OF THE EMBODIMENTS

Figure 1:
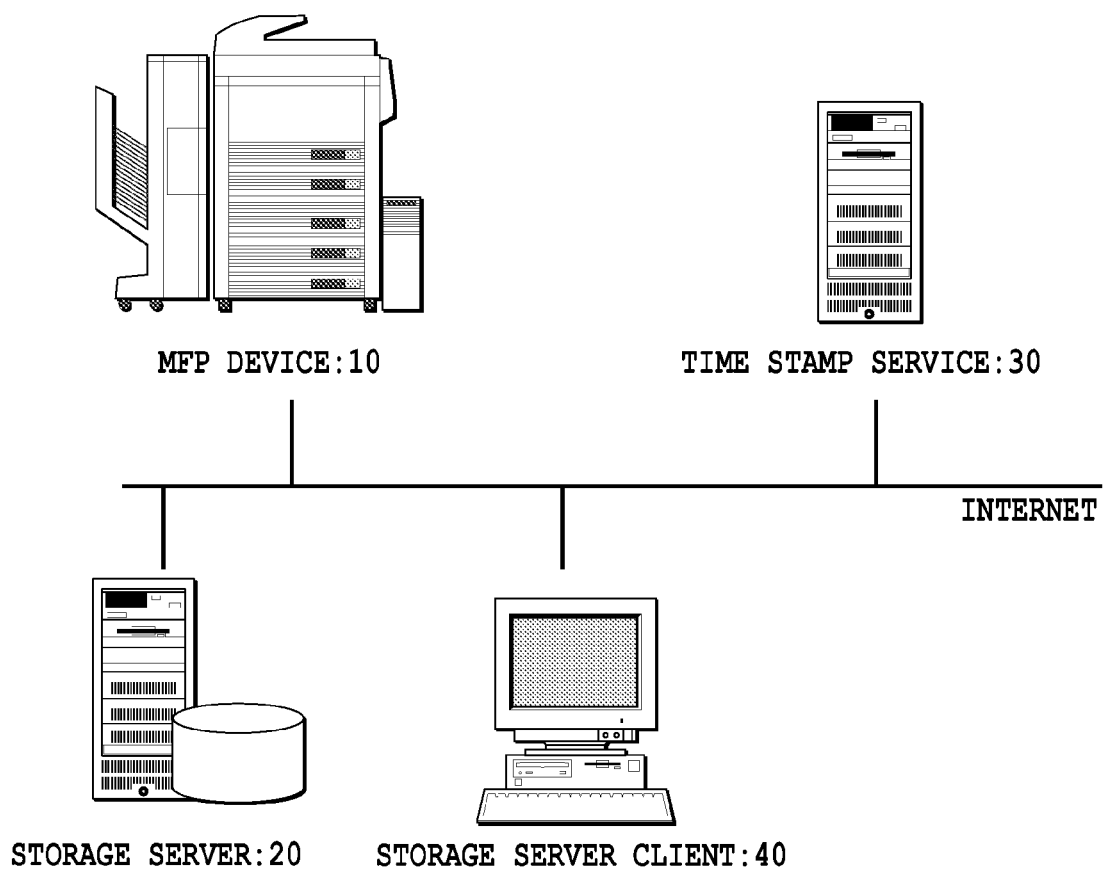
FIG. 1 is a block diagram showing a configuration of a system according to one embodiment of the present invention.

Embodiments of the present invention will be described below in detail with reference to the drawings. Note that components having the same functions are denoted by the same reference numerals in the drawings described below, and redundant descriptions thereof are omitted.

In one embodiment of the present invention, even if image reading processing by a scanner or the like or printing processing by a printer or the like is interrupted, the same scan setting or print setting as that prior to the interruption may be used. Furthermore, in another embodiment, even if a different scanner or printer is used after restart, image processing (scanning processing or printing processing) may be performed with the same setting. In one embodiment of a system according to the present invention, an image processing device (e.g., a multifunction peripheral, scanner, printer, or the like) and an information processing device, such as a storage server, are connected via a network (e.g., the Internet, LAN, or a combination thereof). Note that the image processing device is capable of executing image processing including at least one of image reading processing and image printing processing.

In one embodiment, in the case of scanning processing, when scanning is interrupted due to an error or a request by a user, the system may be capable of temporarily saving scan setting information of a scan setting, in addition to scanned image data, in the information processing device while associating the scan setting information and the data with the user. When the user restarts the interrupted scanning, the image processing device may be capable of performing the scanning based on the scan setting information saved in the information processing device arranged on the network. Thus, the characteristics (e.g., resolution, color specification of monochrome or color, size specification of document file, reading density, and the like) of the image data that is obtained by the scanning can be made to be the same both before the interruption and after the interruption.

In one aspect, since the scanned image data and the scan setting information are saved in association with a certain user in the information processing device arranged on the network, the restart of the scanning can be performed with a device separate from the device which previously performed the scanning prior to the interruption of the scanning. In yet another aspect, since the scanned image data that was scanned before the interruption, and scanned image data that is scanned after the restart can be saved and merged in the information processing device, the merged image data can be shared in a location accessible to the network.

In one embodiment, in the case of printing processing, when printing is interrupted due to an error or a request by a user, the system may be capable of temporarily saving print setting information of a print setting in the information processing device in association with the user. When the user restarts the interrupted printing, the image processing device may be capable of performing the printing based on the print setting information saved in the information processing device. Thus, the characteristics (e.g., printing magnification, color specification of monochrome or color, number of print copies, and the like) of the printed image can be made to be the same both before the interruption and after the interruption.

In one aspect, at the time of interrupting of the printing, the image processing device may manage image data which was already partially printed in addition to the print setting information. Accordingly, at the time of the restart, printing can be performed to maintain continuity from the printed image before the interruption by printing based on the printed image data saved in the information processing device.

In one aspect, by using the system in this manner, at least one of the scan setting and the print setting relating to the interrupted scanning or printing is saved in association with the related user in the information processing device in the network. Since scanning processing or printing processing is performed based on the information saved in the information processing device at the time of restart of the scanning or printing, the setting for the scanning process or the printing process before the interruption can be restored after the interruption. Thus, since it may not be necessary to input the setting again at the time of restart, and scanning or printing can be restarted with a device separate from that used before the interruption, user convenience may be improved.

Note that, in this specification, the "scan setting" refers to any setting selected by the user for the scanning process before scanning processing is started. The setting may include, for example, resolution, color specification of monochrome or color, size specification of document file, reading density, and the like, but is not limited thereto, and may vary depending on the specification of the device. Note that the scan setting information may only need to include at least the scan setting set by the user before the scanning processing is started, and may also include a default value fixedly set in advance.

In this specification, the "print setting" refers to any setting selected by the user for the printing process before printing processing is started. The setting may include, for example, printing scale, color specification of monochrome or color, number of print copies, and the like, but is not limited thereto and may vary depending on the specification of the device. Note that the print setting information may only need to include at least the print setting set by the user before the printing process, and may also include a default value fixedly set in advance.

In one embodiment of the present invention, information showing the scan setting is the scan setting information, and information showing the print setting is the print setting information. In this specification, the scan setting information and the print setting information are generically called "setting information." That is, the setting information relates to the setting of the image processing (e.g., image reading processing or image printing processing) of the image processing device specified by the user for image processing (e.g., scanning or printing).

Further, in this specification, a "job" refers to information for managing the setting information set in the image processing (e.g., scanning or printing) in association with user information on the setting. The job can be achieved by, for example, a database or the like.

Note that, in one embodiment, in the case of printing, the job may be a print job that is to be transmitted to an image forming device such as a printer. Here, the print job includes, for example, image data to be printed, the setting (the number of print sheets, layout, and the like) at the time of printing, and the like. In this case, the print job includes at least print setting information and is associated with the user information.

In this specification, the "user information" is information for the image processing device or the information processing device to identify the user who has performed the setting or the user who wants to use the setting. In this embodiment, as described later, the user information is generated by a user authentication through an input of an ID or password by the user. Note that the user may be an individual or may be two or more persons.

In one embodiment, information managed as the job may include processed image data that has been scanned or printed, or other processed image data. In the case of scanning processing, the processed image data is the scanned image data, and the scanned image data and the scan setting information are managed in association with the related user information in the job. In the case of printing processing, the processed image data is the printed image data, and the printed image data and the print setting information are managed in association with the related user information in the job.

FIG. 1 is a system configuration diagram of a system according to first embodiment of the invention.

In FIG. 1, reference numeral 10 denotes an image processing device, which is an MFP device (i.e., a multifunction peripheral) including a scan function (image reading function) and a print function (printing function). Reference numeral 20 denotes an information processing device, which is a storage server. Reference numeral 30 denotes a time stamp service that can provide a time stamp assigning function in collaboration with the storage server 20. Reference numeral 40 denotes a storage server client 40 that is linked to the storage server 20 to perform processes such as searching, referencing, editing, and deletion of a document.

The MFP device 10, the storage server 20, the time stamp service 30, and the storage server client 40 are connected to each other via the Internet.

In this embodiment, a case is described where all components are connected by the Internet, but it may also be acceptable for only some of the components to be connected via the Internet and the other components to be connected via LAN. It may also be acceptable for all of the components to be connected via the LAN. That is, in this embodiment, each of the components configuring the system are connected via networks such as the LAN, the Internet, and the like.

Further, the description herein is given for the case where only one component is provided for each of the components, but it is also acceptable to provide two or more components in the place of each of the components.

In this embodiment, the MFP device 10 includes an image reading unit, such as a scanner, for reading a document and acquiring image data and an image printing unit such as a printer, for specifying and printing image data.

Note that, in this embodiment, the image processing device includes the image reading unit and the image printing unit, but the image processing device is not limited thereto.

For example, the image processing device may include only one of the image reading unit and the image printing unit. That is, the image processing device of the present invention can be understood to include at least one of the image reading unit and the image printing unit.

The MFP device 10 includes a CPU (not shown) that controls the entire device according to a control program stored in a storage unit (not shown) that may be included in the MFP device 10. Hereinafter, the CPU is called an MFP CPU. The storage unit (hereinafter referred to as "MFP storage unit") has a ROM storing, for example, the control program and the like, of the MFP device 10, such as processes shown in flowcharts described later with reference to FIGS. 2, 6, 8, 9, and the like that may be executed by the MFP CPU. The MFP storage unit has a RAM and the like that is capable of temporarily storing data during a process operation of the MFP CPU or input data.

Further, the MFP device 10 also includes an MFP input operation unit (not shown) including, for example, a keyboard for inputting a predetermined instruction, data, or the like, as well as various switches, an MFP display unit (not shown) that performs various displays showing an input and setting state of the device, and the like.

The storage server 20 includes a CPU (not shown) that controls the entire device according to a control program stored in a storage unit (not shown) that is included in the storage server 20. Hereinafter, the CPU is called a server CPU. The storage unit (hereinafter referred to as "server storage unit") has a ROM storing, for example, the control program and the like of the storage server 20, such as processes shown in flowcharts described later with reference to FIGS. 3, 4, 7, and the like, that may be executed by the server CPU. The server storage unit has a RAM and the like that are capable of temporarily storing data during a process operation of the server CPU or input data.

Figure 2:
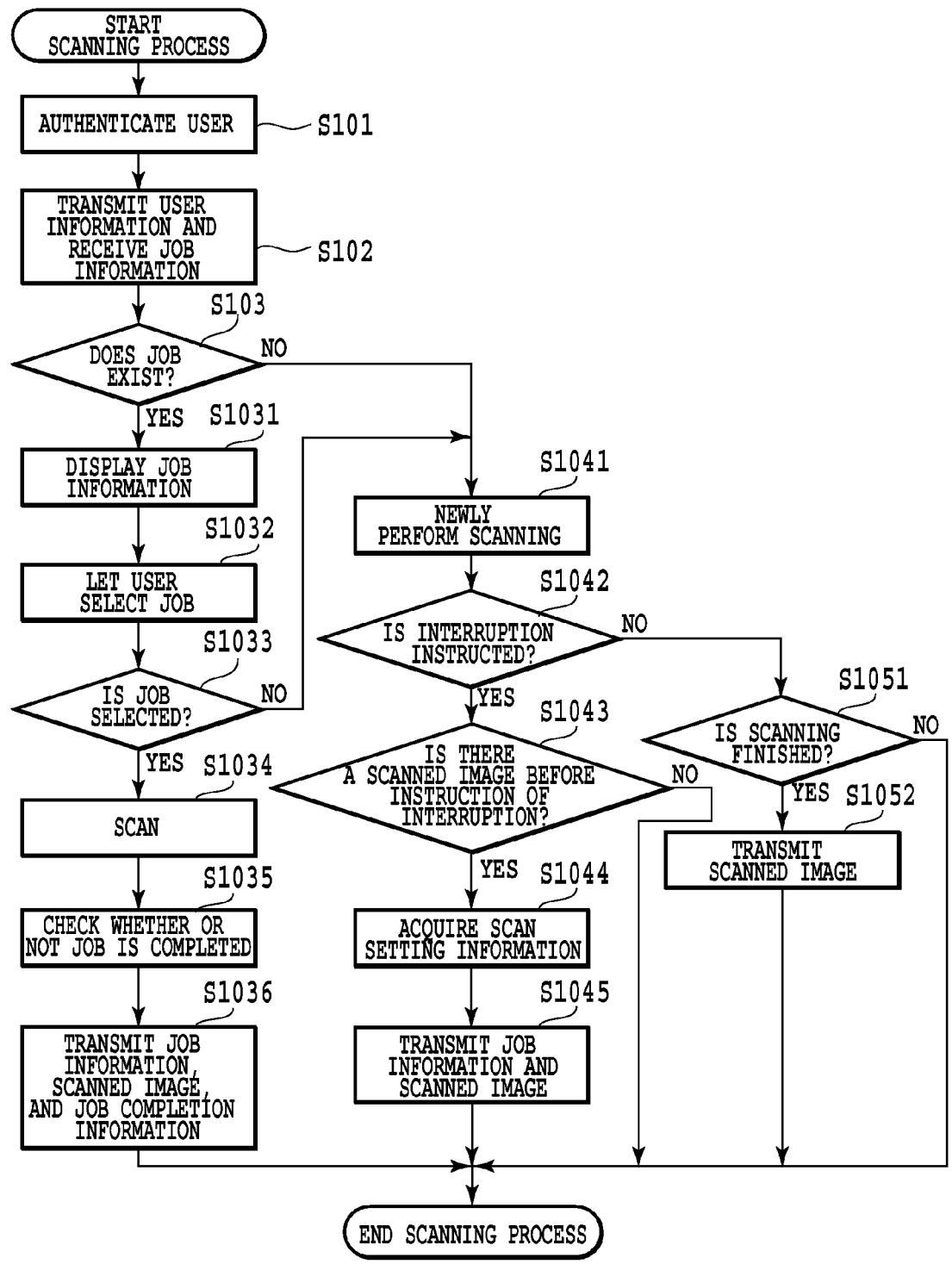
FIG. 2 is a flowchart showing that an MFP device 10 performs a setting restoration process of a scanning process according to a first embodiment of the present invention.

FIG. 2 is a flowchart showing an embodiment in which the MFP device 10 performs scanning processing in the system according to this embodiment.

In step S101, the MFP CPU in the MFP device 10 performs the user authentication and acquires the user information for identifying the user. That is, when the user inputs information (for example, ID, password, or the like) for identifying the user via the MFP input operation unit, the MFP CPU performs the user authentication based on the information to acquire the user information, and stores the acquired user information in the MFP storage unit.

In step S102, the MFP CPU transmits the user information acquired in step S101 to the storage server 20, and acquires job information associated with the user identified by the user information from the storage server 20. That is, the MFP CPU makes a request to the storage server 20 for acquiring the job information, causes the storage server 20 to transmit the job information, and acquires the job information. The acquired job information is stored in the MFP storage unit. In this step, detection result information described later may also be received.

In this specification, the "job information" means information including at least job identification information described later and setting information (e.g., scan setting information or print setting information). For example, the job information received in step S102 may include at least the job identification information and first scan setting information relating thereto.

Note that, in this embodiment, a job relating to the scanning interrupted due to an error or a request by the user is saved in the storage server 20 as described later. The storage server 20 creates the job identification information for identifying the job associated with each user for each job, and saves the job identification information in association with the job. Thus, in step S102, when the request for acquiring the job information is made together with the transmission of the user information from the MFP device 10, the storage server 20 transmits the job information on the received user information to the MFP device 10. That is, the storage server 20 references the job corresponding to the received user information to extract the scan setting information, and transmits the scan setting information together with the job identification information for identifying the job to the MFP device 10 as the job information. The processes will be described later in detail in FIG. 3.

When there are two or more jobs associated with the user authenticated in step S101, all of the job information relating thereto is transmitted to the MFP device 10. Thus, the MFP device 10 acquires the scan setting information included in the job associated with the user identified by the user information and the job identification information thereof saved in the storage server 20.

In step S103, the MFP CPU determines whether or not the job information is acquired in step S102. When the received job information exists, i.e., when the job associated with the user authenticated in step S101 exists in the storage server 20 (YES in step S103), the process proceeds to step S1031. When the job associated with the user authenticated in step S101 does not exist, processing advances to step S1041.

In step S1031, the MFP CPU displays a list of all of the acquired job information (the job identification information and the scan setting information) in an MFP display unit such as a UI of the MFP device 10.

In step S1032, the MFP CPU acquires the job identification information on the job selected by the user from the displayed list of the job information. The acquired job identification information is called target job identification information. The document and the scan setting as the basis of the job relating to the target job identification information are the document and the scan setting as the target of the scanning to be restarted (re-scanned) at this time.

Next, the MFP CPU acquires the scan setting information relating on the target job identification information from the MFP storage unit.

That is, when the job is in the list displayed in the MFP display unit, the user selects the job via the MFP input operation unit. The MFP CPU acquires the target job identification information according to the selection. At this time, when the user does not choose any job, the target job identification information is not acquired.

In step S1033, when the job is not selected or when performing a new scanning process is specified (NO in step S1033), the MFP CPU determines that it is anew scanning process, and shifts processing to a new scan process shown in step S1041 and after.

<Merging Existing Jobs>

When the job is selected (YES in step S1033) and re-scanning is performed, the MFP CPU performs the scanning in step S1034 based on the scan setting information relating to the target job identification information acquired in step S1032. The scanning may be performed for all of the target documents or may be performed by excluding the document scanned before the interruption. The image data (hereinafter referred to as "re-scanned image data") scanned after the restart in this manner is stored in the MFP storage unit.

Note that, when the re-scanning is performed for the entire target document, the re-scanned image data becomes image data corresponding to all of the target document. This is referred to as all-document re-scanned image data. On the other hand, when the re-scanning is performed excluding the document scanned before the interruption, the re-scanned image data becomes image data corresponding to the document scanned at this time. This is called partial re-scanned image data.

In this embodiment, at the time of interrupting the scanning of a document, the scan setting information on the scanning is associated with the user information for identifying the user who wants to scan the document and is saved in the storage server 20. Thus, at the time of restarting the scanning of the document, the document can be scanned with the restored scan setting before the interruption. That is, the scanning can be performed with the same setting before the interruption and after the interruption.

In step S1035, the MFP CPU determines whether or not the job is to be completed by scanning at this time. That is, when the scanning at this time is not interrupted due to an error or a request of the user, the MFP CPU creates job completion information showing that the job has been completed (all of the target document have been scanned). This information is used for post-processing such as deleting a job (the scan setting information or the image data) stored in the storage server 20.

At this time, as for checking of the job completion, the MFP CPU may determine not to complete the job, when performing a process of interrupting the scanning as in step S1042 as described later. In this case, the MFP CPU transmits re-scanned image data which is scanned image data acquired by the scanning at this time together with the target job identification information and the scan setting information relating thereto to the storage server 20. Based on the received target job identification information, the storage server 20 updates the scanned image data included in the job corresponding to the target job identification information to the re-scanned image data acquired by the scanning at this time. Note that the information transmitted together with the re-scanned image data may be only the target job identification information.

In step S1036, the MFP CPU transmits the job information specified by the user, the re-scanned image data, and the job completion information to the storage server 20 as information acquired at this point. Note that, in this step, the job information may be substituted with the target job identification information. That is, when the job is completed by a checking process of step S1035, the scan setting information may not be transmitted.

<Newly Performing Scanning to be Saved as a New Job>

In step S1041, the MFP CPU performs new scanning without merging existing jobs. At this time, the user specifies the scan setting such as, e.g., the resolution, document reading size, and document reading density via the MFP input operation unit, and performs the scanning in accordance with the specified scan setting. In step S101, since the user information identifying the user performing the scanning at this time is stored in the MFP storage unit, the MFP CPU manages the user information and the scan setting in association with each other.

In step S1042, the MFP CPU determines whether or not an interruption instruction of the scanning process is input by the user. As one example, a button or other type of actuator selectable by the user at any time during the scanning is provided as a user input for an interruption instruction. Then, the MFP CPU determines that the interruption instruction is input when the user presses the button. As another example, a message or the like may be presented when an error such as a paper jam is detected to request the user to input an instruction on whether or not to make the interruption. In this manner, there are some ways of performing the determination on the presence or absence of the interruption instruction.

In step S1042, when determining that the interruption instruction is input (YES in step S1042), the MFP CPU interrupts the scanning processing currently performed and proceeds to step S1043. When it is determined that an interruption instruction has no been input (NO in step S1042), processing proceeds to step S1051.

Thus, in step S1042, the MFP CPU determines whether or not to interrupt the image processing in response to the interruption instruction by the user or an error, and interrupts the current image processing when determining that the image processing is to be interrupted.

In step S1043, the MFP CPU determines whether or not there is a scanned image before the interruption. When the MFP CPU determines that there is none (NO in step S1043), the process is ended in that state. If there is a scanned image (YES in step S1043), processing proceeds to step S1044.

In step S1044, the MFP CPU acquires the scan setting information on the scan setting specified in step S1041, and associates the scan setting information with the user information to be stored in the MFP storage unit. That is, the MFP CPU acquires the scan setting information (second scan setting information) on the scanning processing (image processing) set before the interruption. Note that the scan setting information may be acquired and saved in step S1041.

In step S1045, the MFP CPU transmits the scan setting information acquired in step S1044, the user information relating to the scan setting information, and the scanned image acquired in step S1041 to the storage server 20. Note that the scanned image in this step is image data scanned before the interruption, and therefore is the scanned image data.

<Performing Single Scanning>

In step S1051, when the scanning is finished (YES in step S1051), the MFP CPU checks whether or not the scanned image data obtained from the scanning exists. When the image data exists, the MFP CPU transmits the scanned image data to the storage server 20 in step S1052.

Figure 3:
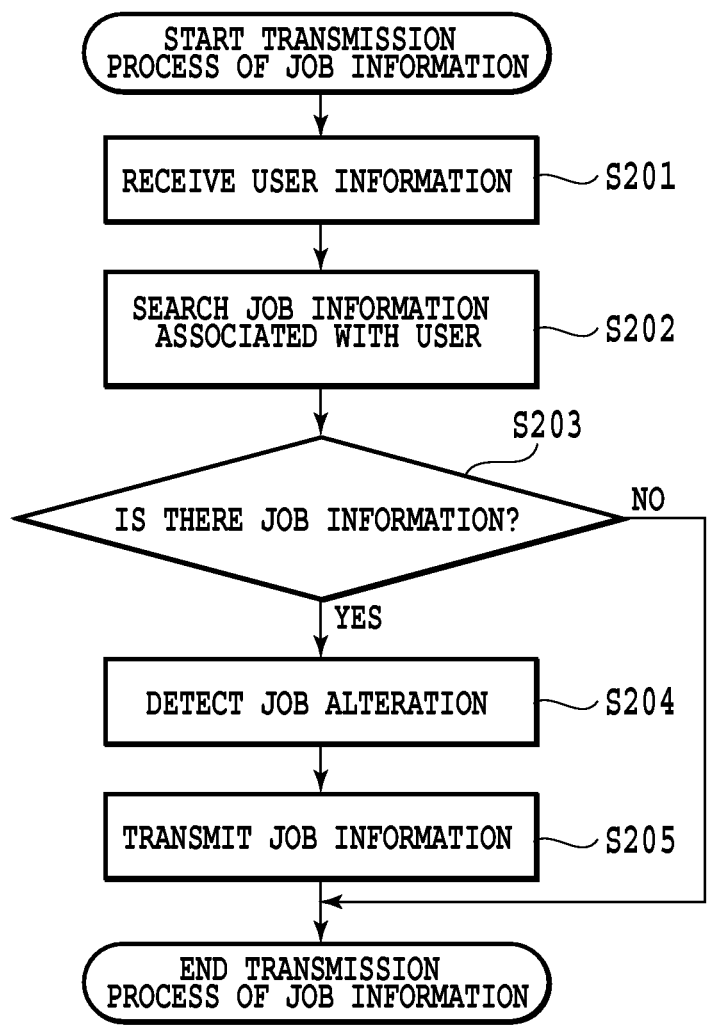
FIG. 3 is a flowchart showing that the information processing device transmits job identification information to an image processing device relating to the setting restoration process of the scanning process in the system according to the first embodiment of the present invention.

FIG. 3 is a flowchart showing that the storage server 20 transmits the job information to the MFP device 10 relating to the setting restoration process of the scanning process in the system according this embodiment.

First, in step S201, the server CPU acquires the user information from the MFP device 10.

In step S202, the server CPU searches the server storage unit to find the job associated with the user identified by the user information acquired in step S201, and collects the job information. That is, the server CPU extracts the job information associated with the user.

In step S203, the server CPU checks the result of the search in step S202, and checks whether or not the job information associated with the user exists. When the job information associated with the user does not exist (NO in step S203), the server CPU transmits information showing that there is no job information to the MFP device 10 and ends the process. When the job information associated with the user exists (YES in step S203), the process proceeds to step S204.

In step S204, the server CPU checks whether or not information included in the job has been altered. This process may require a later-described process in steps S304 or S309 shown in FIG. 4 to be performed in advance. Thus, under the condition in which the job information is assigned an electronic signature or a time stamp, the server CPU performs an alteration detection process to detect any alteration in the scan setting information or processed image data. Note that this step may not be essential in this embodiment.

In step S205, the server CPU transmits all of the extracted job information to the MFP device 10. The server CPU can also transmit the detection result information showing the alteration detection result (check result) in step S204 to the MFP device 10.

Although the description is omitted herein, when the scan setting information or the processed image data is altered in S204, that information or image data may also be transmitted.

Figure 4:
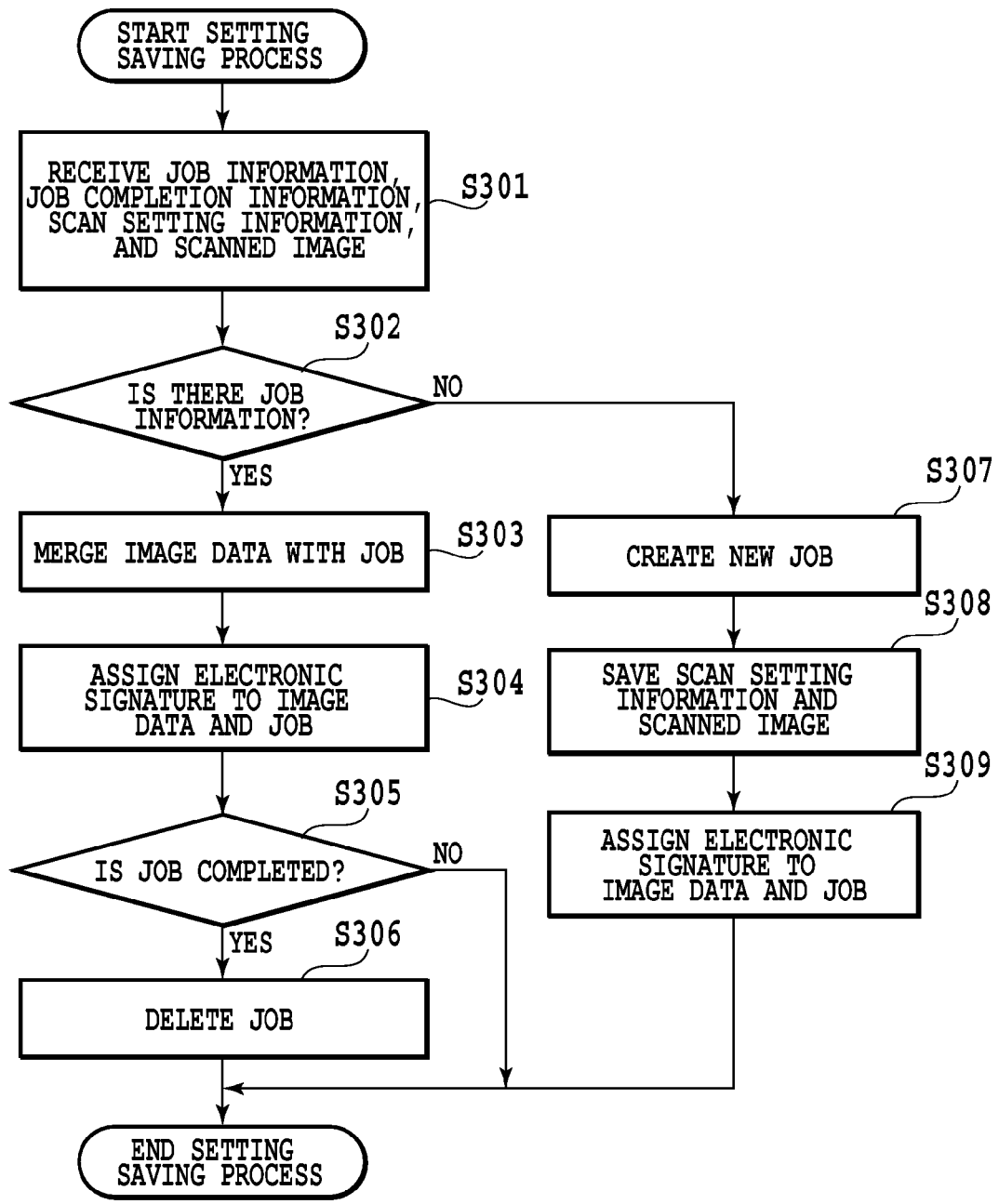
FIG. 4 is a flowchart showing that the information processing device performs saving job information or setting information received from the image processing device relating to the setting restoration process of the scanning process in the system according to the first embodiment of the present invention.

FIG. 4 is a flowchart showing that the storage server 20 performs saving job information or setting information received from the MFP device 10 relating to the setting restoration process of the scanning process in the system according to this embodiment.

In step S301, the server CPU receives predetermined information such as user information, job information (selected by the user), job completion information, scan setting information, and scanned image data (including the re-scanned image data) from the MFP device 10. The server CPU may receive all of the information in some cases, but only a part of the information in other cases. That is, when the information is transmitted in step S1036, the server CPU receives the job information, the job completion information, and the re-scanned image data (scanned image data) in this step. When the information is transmitted in step S1045, the server CPU receives the user information, the scan setting information, and the scanned image data. When the information is transmitted from step S1052, the server CPU receives the scanned image data. Further, when the job is not completed in step S1035, the server CPU receives the job information and the re-scanned image data.

In step S302, the server CPU checks whether or not the information containing the job information is input in step S301. Herein, existence of the job information (YES in step S302) is determined as an instruction for merging with an existing job, and processing advances to step S303, but exchange of information with the MFP device 10 may be performed separately using a flag or the like. If job information doesn't exist (NO in step S302), processing advances to step S307.

In this embodiment, the MFP device 10 transmits the job information to the storage server 20 in steps S1035 and S1036, i.e., after the image processing such as the scanning processing is restarted. Thus, when receiving the job information from the MFP device 10, the storage server 20 may be required to merge the scanned image data before the interruption and the scanned image data after the restart. That is, the storage server 20 receives the job information after the user has instructed the restart of the scanning. Therefore the job information is information instructing the storage server 20 to merge the scanned image data.

In this step, when receiving the information containing the job information in step S301, the server CPU determines to perform the merge of the image data scanned before the interruption and the image data scanned after the restart.

In step S303, the server CPU merges the image data received in step S301 with the image data already saved in the job specified in step S301. At this time, this embodiment is described as a case where a single file is actually created. However, it is also possible to show the data as one file to the user, although the one file internally includes separated files.

That is, based on the job identification information included in the job information, the server CPU identifies the job to be the target of the merge of the image data before the interruption and after the restart, and extracts the scanned image data to be the merge target already saved. Next, the server CPU merges the extracted scanned image data and the re-scanned image data received in step S301. The merged image data is stored in the server storage unit.

At this time, when the scanned image data to be the merge target already saved is made into a file, the server CPU adds the re-scanned image data to the file to create a file.

Note that, in the merge described above, in the case of the partial re-scanned image data, the re-scanned image data is directly merged with the scanned image data to be the merge target.

On the other hand, when the re-scanned image data is the all-document re-scanned image data, a portion overlapping with the image data can be deleted from the all-document re-scanned image data based on the scanned image data to be the merge target extracted before the merge. The extracted scanned image data to be the merge target may be substituted with the all-document re-scanned image data without performing such deletion. Even with the substitution, the restart of the process causes image data not scanned before the interruption to be consequently added to the image data scanned before the interruption.

Since the setting before the interruption can be restored after the restart, even when the re-scanning is performed on all of the target documents or when the re-scanning is performed on the documents excluding those already scanned before the interruption, the user convenience can be improved.

In step S304, the server CPU assigns at least one of an electronic signature and a time stamp to at least one of the scan setting information and the merged image data. The object thereof is to detect the change of the scan setting or the image data, whereby information other than those described above may be included and one or both of the electronic signature and the time stamp may be assigned. When assigning the time stamp, linking with the time stamp service 30 shown in FIG. 1 may be performed. Since the technology for time stamping is known, a description thereof is omitted. It should furthermore be noted that this step may not be essential in this embodiment.

In step S305, the server CPU checks whether or not the information including the job completion information is input in step S301. When the job completion information is included (YES in step S305), processing advances to step S306 where the server CPU deletes the target job stored in the server storage unit. When the job completed information is not inputted (NO in step S305), the setting saving process may be ended. In step S306, only the setting information is deleted without deleting the entire job. Alternatively, a method in which the job is entirely held as internal information and managed as a job incapable of merging or the like may also be acceptable.

When determining that merging of the existing job is not performed in step S302 (NO in step S302), processing proceeds to step S307 where the server CPU creates a new job. That is, based on the user information, the scan setting information, and the scanned image data received in step S301, the server CPU creates a job associated with the user identified by the user information. At this time, the server CPU also creates the job identification information for identifying the job newly created.

In step S308, the server CPU saves the scan setting information and the scanned image data received in step S301 in the server storage unit. That is, the created job is saved in the server storage unit. At this time, the scanned image data may be saved in the form of a file.

In step S309, the server CPU assigns at least one of an electronic signature and a time stamp to at least one of the scan setting information and the scanned image data in the same or similar manner as in step S304.

By assigning the electronic signature or the time stamp to the saved setting information or the image data, the change of the scan setting or the image data can be detected.

Figure 5:
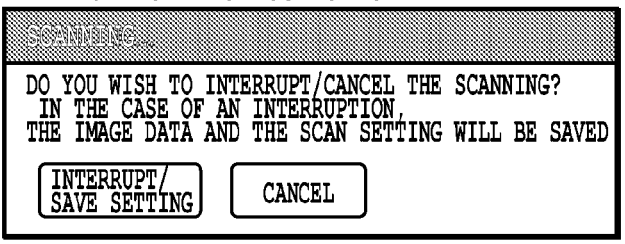
FIG. 5 is a diagram showing an example of a UI of the image processing device relating to the setting restoration process of the scanning process in the system according to the first embodiment of the present invention.
Figure 5:
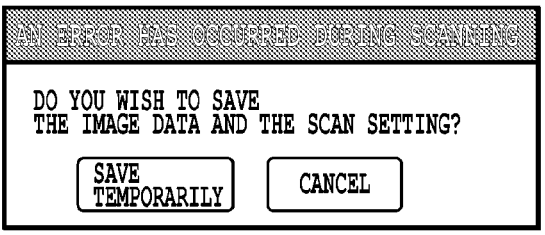
Figure 5:
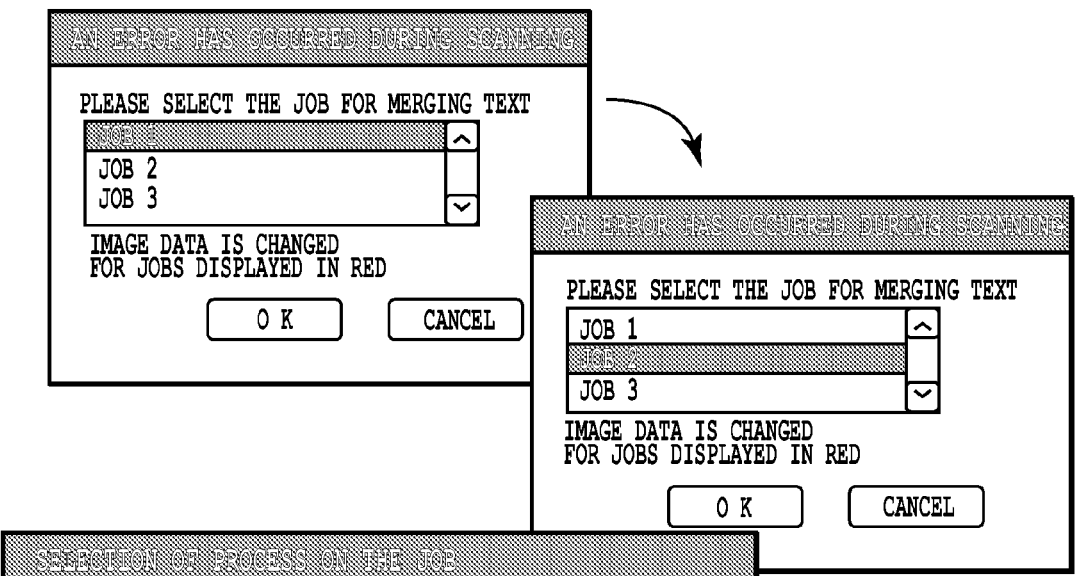

FIG. 5 is a diagram showing an example of a UI of the MFP device 10 relating to the setting restoration process of the scanning process in the system taking over setting according to this embodiment.

As an "example of scan interruption instruction UI," the user can instruct the interruption of the scanning or a cancellation of the scanning by displaying this dialogue during the scanning (while the document is being read). The dialogue may include information such as the scan setting, scanning process (showing up to which page the scanning has been performed), or the like.

As an "example of saving instruction UI at occurrence of error," this dialogue is displayed when an error has occurred during the scanning. The user can specify whether or not to save the scanned image data or the scan setting before occurrence of the error.

As an "example of job selection UI," an example of UI displaying a job list associated with the user after the user authentication in the MFP device is shown. The job names may be displayed with different colors to show the user of the change of the image data or the scan setting with the distinction of colors. There are various ways of showing the user, and thus there may be other embodiments as well.

This embodiment is also effective when one file is created by two or more people in different places. In this embodiment, the scanned image data and the scan setting for the scanning are managed in a client server by the user information for the scanning. When restarting the scanning, the user can select a job associated with the user information relating to oneself. The job includes the scan setting information, whereby the scan setting before the interruption can automatically restored in the scanning after the restart merely by the user selecting the job to be restarted.

Thus, by sharing the user information between two or more people, data created in different places by the two or more people can be merged. For example, even if a user A and a user B having common recognition for creating a file are in locations apart from each other, image data scanned and interrupted by the user A can be merged with image data scanned by the user B. That is, since the user information and the job are managed in the information processing device arranged in the network, images can be merged in the network even if the user A and the user B are apart from each other.

In the first embodiment, a form of setting restoration relating to scanning has been described. In a second embodiment, a form of setting restoration relating to printing will be described.

Figure 6:
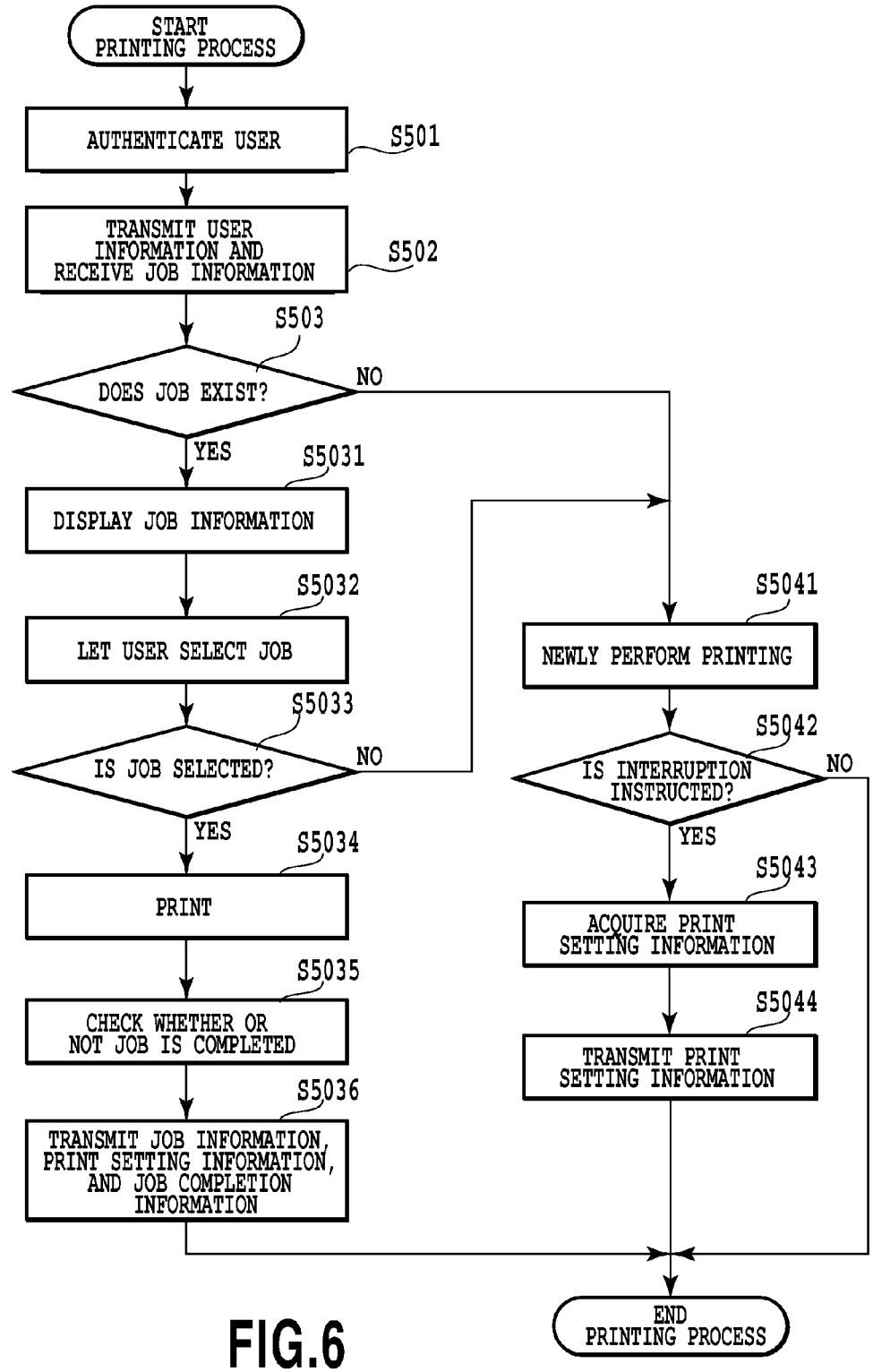
FIG. 6 is a flowchart showing that the image processing device performs a setting restoration process of a printing process in the system according to the first embodiment of the present invention.

FIG. 6 is a flowchart showing that the MFP device 10 performs the setting restoration process of the printing process in the system according to this second embodiment. Most of the processes in this flowchart are the same or similar to the processes in FIG. 2.

In FIG. 6, the processes of steps S501 to S5033 are the same or similar to the processes of steps S101 to S1033.

In step S501, in the same or similar manner as in step S101, the MFP CPU performs the user authentication and acquires the user information for identifying the user.

In step S502, in the same or similar manner as in step S102, the MFP CPU transmits the user information acquired in step S501 to the storage server 20, and acquires the job information associated with the user identified by the user information from the storage server 20. Note that, in this embodiment, the MFP CPU also receives printed image data and image data to be printed relating to the job information from the storage server 20 in this step.

Note that this embodiment discloses a printing process, whereby the job information includes at least the job identification information and first print setting information.

Note that, in this embodiment, the storage server 20 saves the job relating to the printing interrupted due to an error or a request by the user. The storage server 20 creates the job identification information for identifying the job associated with each user for each job, and saves the job identification information in association with the job. Thus, when the MFP device 10 requests a job information acquisition together with transmitting the user information in step S502, the storage server 20 references the job to extract the print setting information, and acquires the job identification information relating to the print setting information. Then, the job information (the job identification information and the print setting information) relating to the received user information is transmitted to the MFP device 10.

In this embodiment, the printed image data is also managed in association with each job. The image data (original image data) to be printed as the document is saved in the storage server 20, and each job is managed in association with the relating image data to be printed. Thus, in this embodiment, the print setting information and the printed image data are managed as a job in association with the user information, and the image data to be printed is also additionally managed in association therewith.

Thus, when an acquisition request of the printed image data and the image data to be printed is made, the storage server 20 transmits the printed image data and the image data to be printed relating to the job information to be transmitted to the MFP device 10.

When there are two or more jobs associated with the user authenticated in step S501, all of the job information relating thereto, all of the printed image data and all of the image data to be printed relating to the job information are transmitted to the MFP device 10.

In step S503, in the same manner as in step S103, the MFP CPU determines whether or not the job information is acquired in step S502. If the job information is acquired (YES in step S503), processing advances to step S5031. If the job information does not exist (NO in step S503), processing advances to step S5041.

In step S5031, in the same or similar manner as in step S1031, the MFP CPU displays a list of all of the acquired job information (the job identification information and the print setting information) in the MFP display unit of the MFP device 10.

In step S5032, in the same or similar manner as in step S1032, the MFP CPU acquires the target job identification information on the job selected by the user from the displayed list of the job information. The document (the image data to be printed) and the print setting as the basis of the job relating to the target job identification information are the document and the print setting as the target of the restart of the scanning at this time.

In step S5033, in the same or similar manner as in step S1033, the MFP CPU determines whether or not the job is selected. If the job is selected (YES in step S5033), processing proceeds to step S5034). If the job is not selected (NO in step S5033), processing proceeds to step S5041.

<Merging Existing Jobs>

In step S5034, a print job presented as a saved job is executed. That is, when the job is selected to perform re-printing, the MFP CPU performs the printing based on the print setting information on the target job identification information acquired in step S5032. At this time, since the image data to be printed and the printed image data are acquired in step S5032, the MFP CPU performs the printing of image data in which the printed image data is excluded from the image data to be printed based on the information. Thus, the printing of the target document can be continued with the print setting before the interruption. Since the image data to be printed and the job as the target after the interruption are managed by the storage server 20 arranged in the network, printing can be performed with different devices before the interruption and after the interruption as long as the devices are connected to the network.

In step S5035, the MFP CPU checks whether or not the printing of the job is finished. It may be automatically determined that the job is completed when the printing is completed. That is, in the same or similar manner as in step S1035, the MFP CPU determines whether or not to complete printing of the job at this time.

When determining not to complete the job, the MFP CPU transmits re-printed image data which is printed image data acquired by the printing at this time to the storage server 20 together with the target job identification information and the print setting information relating thereto. Based on the received target job identification information, the storage server 20 updates the printed image data included in the job corresponding to the target job identification information to a form including the re-printed image data acquired by the printing at this time. Note that the information transmitted together with the re-printed image data may be only the target job identification information.

In step S5036, the MFP CPU transmits the job information, the re-printed image data (the printed image data), and the job completion information to the storage server 20. Note that, in this step, the job information may be substituted with the target job identification information. That is, when the job is completed by the checking process of step S5035, the print setting information may not be transmitted.

<Performing Printing to be Saved as a New Job>

In step S5041, the MFP CPU performs the printing process based on the image data to be printed. Herein, it is assumed that the MFP device 10 specifies a file saved in the storage server 20 to specify the image data to be printed, thereby performing the print setting and executing the printing. Thus, the MFP CPU acquires the image data to be printed held in advance in the storage server 20 by transmitting the acquisition request, and performs the printing process in accordance with the set print setting based on the acquired image data to be printed.

In this embodiment, the image data to be printed is held in the storage server 20 in advance, but the embodiment is not so limited. It may be transmitted from an image supplying device such as a PC connected via the network, or may be input via a portable recording medium. That is, in this embodiment, an acquisition method of the image data to be printed may vary, as long as the MFP device 10 consequently acquires the image data to be printed.

In step S5042, when receiving an interruption instruction (YES in step S5043), processing advances to step S5043 where the MFP CPU acquires print setting information (second print setting information). Details of the embodiment are approximately the same as in the case of the scanning, and therefore description thereof is being omitted. When no interruption instruction is received (NO in step S5043), the process may be ended.

In step S5044, the MFP CPU transmits the print setting information acquired in step S5043 and the print image acquired in step S5041 to the storage server 20. Note that the print image in this step is image data printed before the interruption, and therefore is the printed image data.

The process of transmitting the job information to the MFP device 10 in the storage server 20 according to this embodiment can be carried out in the same or similar manner as that of FIG. 3, and therefore description thereof is omitted.

Figure 7:
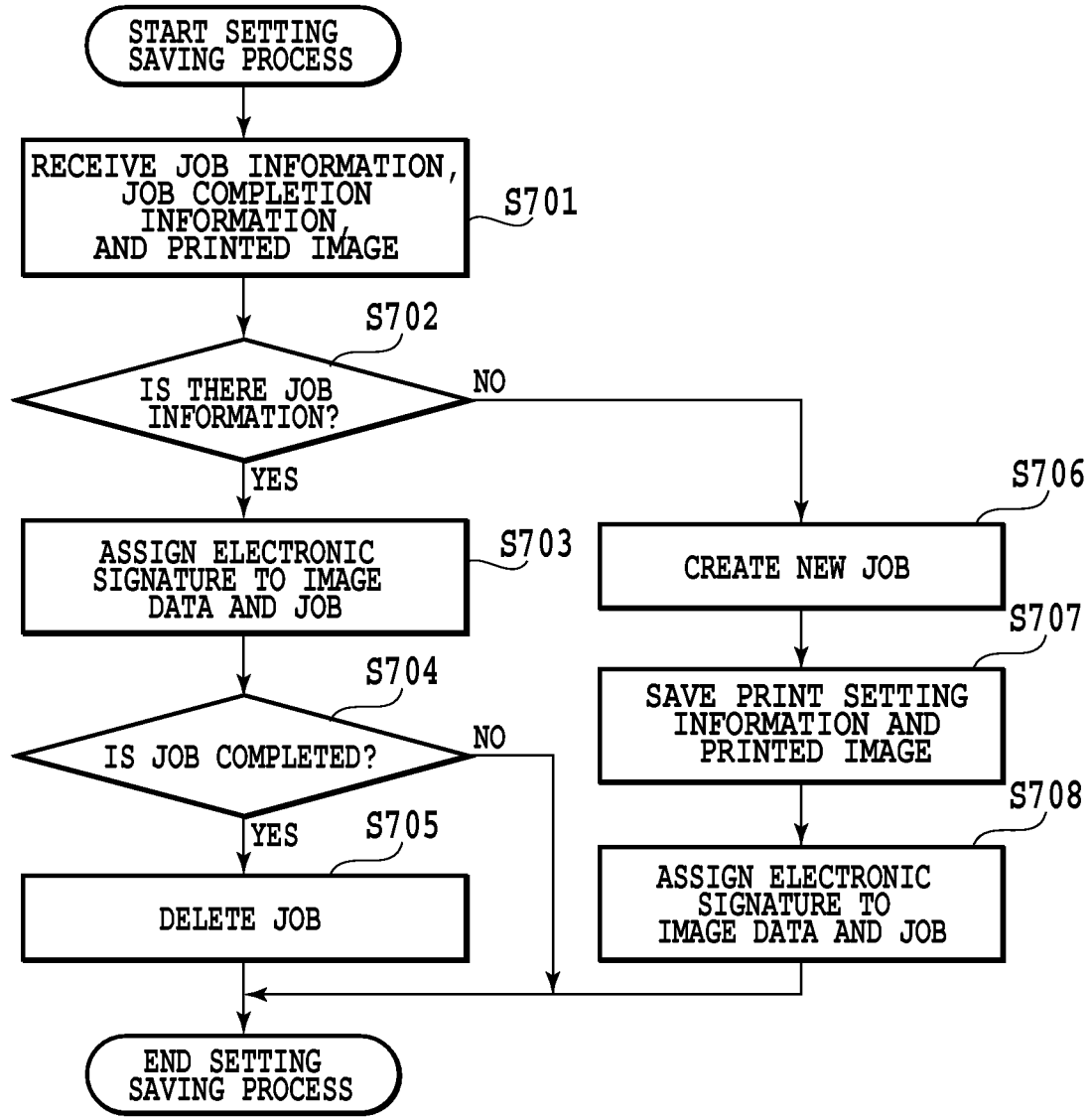
FIG. 7 is a flowchart showing that an information processing device performs saving job information or setting information received from an image processing device relating to a setting restoration process of a printing process in a system according to a second embodiment of the present invention.

FIG. 7 is a flowchart showing that the storage server 20 saves the job information or the setting information received from the MFP device 10 relating to the setting restoration process of the printing process in the system according to this embodiment.

In step S701, the server CPU receives the user information, the job information (selected by the user), the job completion information, and the printed image data (including the re-printed image data) from the MFP device 10. The server CPU may receive all of the information in some cases, but only a part of the information in other cases. That is, when the information is transmitted in step S5036, the server CPU receives the job information, the job completion information, and the re-printed image data (the printed image data) in this step. When the information is transmitted in step S5044, the server CPU receives the user information, the print setting information, and the printed image data. Further, when the job is not completed in step S5035, the server CPU receives the job information and the re-printed image data.

In step S702, in the same or similar manner as in step S302, the server CPU checks whether or not the information containing the job information input is received in step S701. If the job information has been received (YES in step S702), processing advances to step S703. If there is no job information (NO in step S701), processing proceeds to step S706.

In step S703, in the same or similar manner as in step S304, the server CPU assigns at least one of the electronic signature and the time stamp to the print setting information. Note that this step may be optional and thus may not be essential in this embodiment.

In step S704, in the same or similar manner as in step S305, the server CPU checks whether or not the information including the job completion information is input in step S701. When the job completion information is included (YES in step S704), processing advances to step S705 where the server CPU deletes the target job stored in the server storage unit in the same or similar manner as in step S306. When job completion information is not included (NO in step S704), the setting saving process may be ended.

When determining that there is no existing job in step S702 (NO in step S702), processing advances to step S706 where the server CPU creates a new job in the same or similar manner as in step S307. That is, based on the user information and the printed image data, the server CPU creates a job associated with the user identified by the user information. At this time, the server CPU also creates the job identification information for identifying the job newly created.

In step S707, the server CPU saves the created job in the server storage unit. At this time, the scanned image data may be saved in the form of a file.

In step S708, in the same or similar manner as in step S309, the server CPU assigns the electronic signature or the time stamp to at least one of the print setting information and the printed image data.

Note that, in this embodiment, the printed image data and the image data to be printed are received in addition to the job information in step S502, but the information to be received in addition to the job information may be only the image data to be printed. In this case, the document is printed again from the beginning in step S5034, but the print setting can automatically be restored after the restart even if the print setting before the interruption is not input again.

In a third embodiment, the system has a configuration in which the storage server 20 cannot detect the alteration of the image data, and the MFP device 10 which is USB compatible will be described.

The MFP device 10 as the image processing device according to this third embodiment includes a USB port as means for linking with a USB memory as a portable recording medium.

Figure 8:
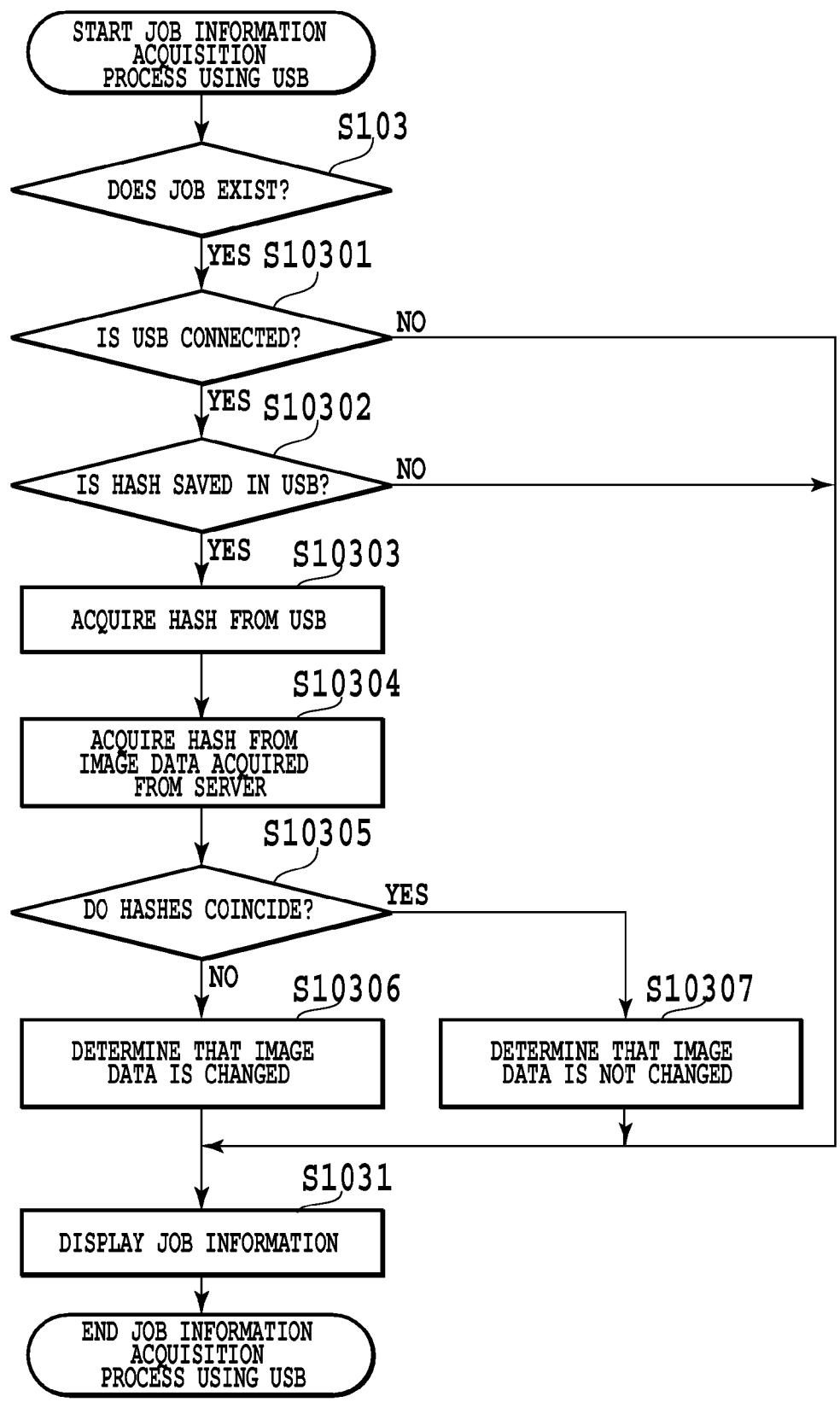
FIG. 8 is a diagram showing differences, from FIG. 2, of the system according to the second embodiment of the present invention, and is a flowchart showing that the MFP device 10 performs a process of change detection of image data, assuming that the MFP device 10 is USB compatible.
Figure 9:
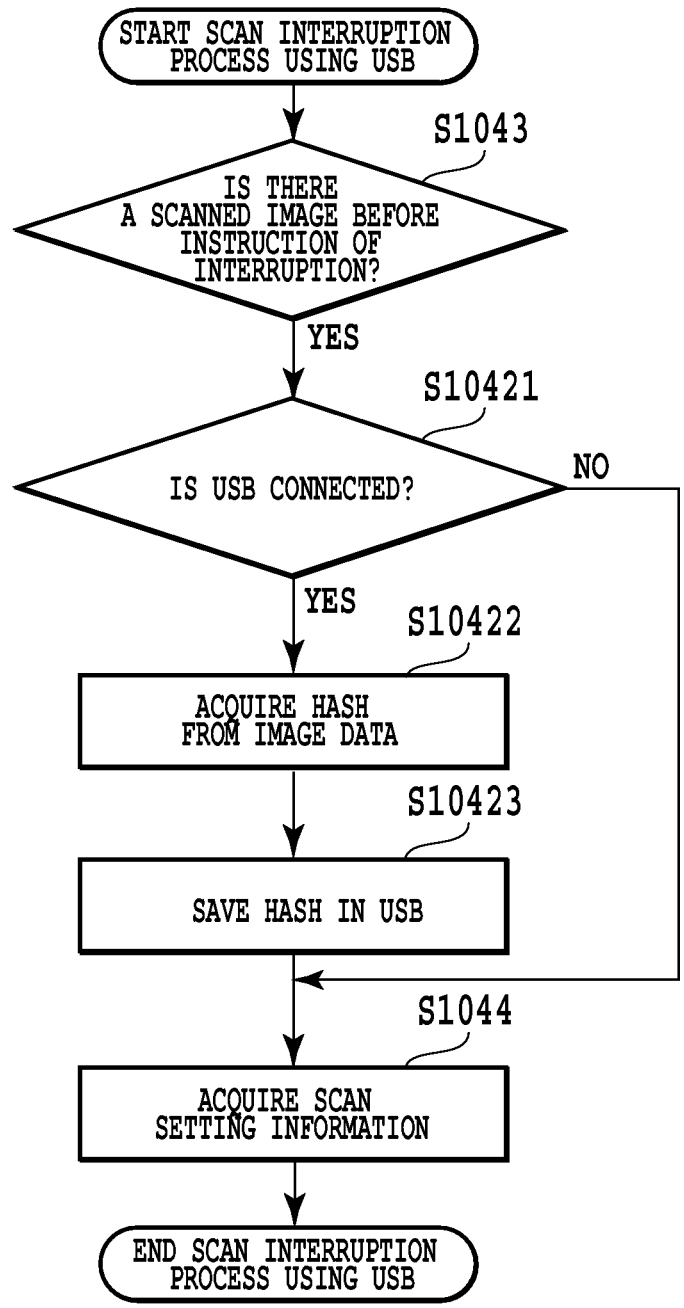
FIG. 9 is a diagram showing differences, from FIG. 2, of the system according to the second embodiment of the present invention, and is a flowchart showing that the MFP device 10 performs a process of change detection of image data, assuming that the MFP device 10 is USB compatible.

FIGS. 8 and 9 are diagrams that have differences from FIG. 2, and are flowcharts of processes that change detection of image data performed by the MFP device 10, assuming that the MFP device 10 is USB compatible. In FIGS. 8 and 9, steps S103, S1031, S1043, and S1044 show steps that are the same or similar to those described in FIG. 2.

Note that, in the third embodiment, it may be requisite to transmit not only the job information and the scan setting information but also the image data in step S205 when it is determined that the job is changed in step S204 of FIG. 3.

<Merging Existing Jobs>

In step S10301 of FIG. 8, the MFP CPU checks whether the USB memory is connected to the MFP device 10. That is, the MFP CPU detects whether or not the USB memory is connected to the USB port. When it is connected (YES in step S10301), processing advances to step S10302 where the MFP CPU checks whether or not a hash is saved in the USB memory. When it is not connected (NO in step S10301), the process proceeds to step S1031.

When the hash is saved in the USB (YES in step S10302), processing advances to step S10303 where the MFP CPU acquires the hash from the connected USB memory. When the hash is not saved in the USB, the process proceeds to step S1031.

In step S10304, the MFP CPU acquires a hash relating to the job information acquired in step S102 from the storage server 20. In this embodiment, as described later, the hash of the scanned image data is acquired, and the hash is managed in association with a corresponding job in the storage server 20. Thus, in this step, the MFP CPU makes a request of acquiring the hash corresponding to the job information acquired in step S102 to the storage server 20, whereby the storage server 20 transmits the hash to the MFP device 10.

In step S10305, the MFP CPU compares the hash acquired in step S10303 and the hash acquired in step S10304, and determines whether or not the image data is changed based on whether the hashes coincide or not.

When they coincide (YES in step S10305), processing advances to step S10307, where the MFP CPU determines that the image data is not changed. However, in this case as well, when the detection result information showing that the job change is detected is transmitted in step S205, there is a possibility of the scan setting being altered. Thus, when the detection result information is received in step S102, the MFP CPU may show in the MFP display unit that there is a possibility of alteration in the scan setting.

On the other hand, when the hashes do not coincide (NO in step S10305), processing advances to step S10306, where the MFP CPU determines that the image data is changed. That is, the fact that the detection result information is transmitted in step S205 and that the hashes do not coincide shows that at least the image data is altered. Thus, when receiving the detection result information in step S102, the MFP CPU may only have to show in the MFP display unit that the scanning needs to be performed again.

<Performing New Scanning to be Saved as a New Job>

In step S10421 of FIG. 9, the MFP CPU checks whether the USB memory is connected to the MFP device 10.

When it is connected (YES in step S10421), processing advances to step S10422, where the MFP CPU acquires the hash of the scanned image data obtained by the scanning processing of step S1041. When it is not connected (NO in step S10421), the process proceeds to step S1044.

In step S10423, the hash obtained in step S10422 is saved in the USB memory.

By holding the hash acquired based on the scanned image data after the interruption of the scanning in a separate storage location from the storage server 20 in this manner, the hash of the separate storage location can be used as a reference in an alteration inspection of the image data.

Note that, in this embodiment, in the case of the printing processing, the alteration inspection of the image data may be performed as described above by substituting the hash with the print setting information in FIGS. 8 and 9 and storing the print setting information in the USB memory.

That is, between step S503 and step S5031 of FIG. 6, the MFP CPU first determines whether or not the USB memory is connected to the MFP device 10, and acquires the print setting information from the USB memory when it is connected. Next, the MFP CPU extracts the print setting information from the job information acquired in step S502, compares the extracted print setting information with the print setting information acquired from the USB memory to see whether they coincide, and detects the change in print setting information.

Between step S5043 and step S5044, the MFP CPU first determines whether or not the USB memory is connected to the MFP device 10. Next, when it is connected, the MFP CPU saves the print setting information acquired in step S5043 in the USB memory.

In this manner, the detection of an alteration of the print setting information is performed in the printing processing.

It is possible to apply the present invention to other embodiments such as a system including two or more equipment components (e.g., computer, interface equipment, reader, printer, and the like), or to a device formed of one component (multifunction peripheral, printer, facsimile device, or the like).

In one embodiment in accordance with the present invention, it may be possible to save a scan setting or a print setting in an information processing device in a network and use the setting at a restart time, and aspects of the invention may also provide for the same setting to be used for two or more times of scanning or printing. Since the setting is saved in the information processing device in the network in this embodiment, setting information can be referenced and used from any scanner or printer.

The embodiments described above also include a processing method in which an operating program having computer-executable instructions provides an embodiment of a functional configuration of the invention. The program can be stored in a storage medium, whereby the program is read as a code and executed by a computer. That is, in one aspect, a computer-readable storage medium may be included in the scope of the invention. The computer program itself may also be included in the embodiments described above as well as the storage medium storing the computer program.

As the storage medium, a floppy disk, a hard disk, an optical disk, a magneto-optical disk, a CD-ROM, a magnetic tape, a nonvolatile memory card, a ROM, and the like can be used, for example.

In one version, in addition to a single program stored in a storage medium, as described above, that executes the processes, the operations of embodiments of the invention may also be performed by an OS in cooperation with other software, or function of an extension board, and may also be included in the scope of the invention and the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-287639, filed Nov. 5, 2007, which is hereby incorporated by reference herein in its entirety.

What is claimed is:

1. An image processing system comprising an image processing device capable of executing image reading processing and an information processing device connected to the image processing device via a network, the image processing device comprising:
   a unit configured to execute a scanning process on a document in accordance with scan setting information specified by a user;
   a determining unit configured to determine the presence or absence of an instruction to interrupt the executed scanning process;
   a first transmitting unit configured to, in a case where the determining unit determines the presence of an instruction to interrupt the executed scanning process, interrupt the executed scanning process and transmit to the information processing device the specified scan setting information and scanned image data before the interruption, wherein the information processing device includes a saving unit configured to receive and save the scan setting information and the scanned image data transmitted by the first transmitting unit;
   a unit configured to, in a case where a job associated with the user exists in the information processing device, acquire and display job information including job identification information and scan setting information of the job on a display;
   a unit configured to, in a case where the job is selected by the user from the displayed job information, execute a scanning process based on the scan setting information corresponding to the job identification information of the selected job; and
   a second transmitting unit configured to transmit the job information of the selected job and the scanned image data to the information processing device,
   wherein the information processing device includes a unit configured to merge the scanned image data saved by the saving unit with the scanned image data transmitted by the second transmitting unit based on the job information of the selected job and the scanned image data transmitted by the second transmitting unit.

2. The image processing system according to claim 1, wherein the scan setting information comprises at least one of scanning resolution, color specification of monochrome or color, document reading size, and document reading density.

3. The image processing system according to claim 1, wherein the information processing device further comprises a unit configured to assign an electronic signature or a time stamp to at least one of the scan setting information and the scanned image data saved by the saving unit.

4. The image processing system according to claim 2, wherein the information processing device further comprises a unit configured to assign an electronic signature or a time stamp to at least one of the scan setting information and the scanned image data saved by the saving unit.

5. The image processing system according to claim 1, wherein the information processing device further comprises a unit configured to assign an electronic signature or a time stamp to the merged image data.

6. The image processing system according to claim 2, wherein the information processing device further comprises a unit configured to assign an electronic signature or a time stamp to the merged image data.

7. An image processing method in an image processing device of an image processing system comprising the image processing device capable of executing image reading processing and an information processing device connected to the image processing device via a network, the image processing method comprising:
   in a case where a job associated with an authenticated user does not exist in the information processing device, executing a scanning process on a document in accordance with scan setting information specified by the user;
   determining the presence or absence of an instruction to interrupt the executed scanning process;
   in a case where the presence of an instruction to interrupt the executed scanning process is determined in the determining step, interrupting the executed scanning process, transmitting to the information processing device the specified scan setting information and scanned image data before the interruption, and receiving and saving the scan setting information and the scanned image data transmitted in the transmitting step;
   in a case where a job associated with the user exists in the information processing device, acquiring and displaying job information including job identification information and scan setting information of the job on a display;
   in a case where the job is selected by the user from the displayed job information, executing a scanning process based on the scan setting information corresponding to the job identification information of the selected job;
   transmitting the job information of the selected job and the scanned image data to the information processing device; and
   merging the scanned image data saved in the saving step with the scanned image data transmitted in the transmitting step based on the job information of the selected job and the scanned image data transmitted in the transmitting step.

8. An image processing device in an image processing system comprising the image processing device capable of executing image reading processing and an information processing device connected to the image processing device via a network, the image processing device comprising:
   a unit configured to execute a scanning process on a document in accordance with scan setting information specified by a user;
   a determining unit configured to determine the presence or absence of an instruction to interrupt the executed scanning process; and
   a first transmitting unit configured to, in a case where the determining unit determines the presence of an instruction to interrupt the executed scanning process, interrupt the executed scanning process and transmit to the information processing device the specified scan setting information and scanned image data before the interruption to be saved in a saving unit of the information processing device,
   wherein, in a case where a job associated with the user exists in the information processing device, the image processing device further comprises:
   a unit configured to acquire and display job information including job identification information and scan setting information of the job on a display;
   a unit configured to, in a case where the job is selected by the user from the displayed job information, execute a scanning process based on the scan setting information corresponding to the job identification information of the selected job; and a second transmitting unit configured to transmit the job information of the selected job and the scanned image data to the information processing device to be merged with the scanned image data saved in the saving unit based on the job information.

9. An information processing device in an image processing system comprising an image processing device capable of executing image reading processing and the information processing device connected to the image processing device via a network,
wherein the image processing device includes:
a unit configured to execute a scanning process on a document in accordance with scan setting information specified by a user;
a determining unit configured to determine the presence or absence of an instruction to interrupt the executed scanning process; and
a first transmitting unit configured to, in a case where the determining unit determines the presence of an instruction to interrupt the executed scanning process, interrupt the executed scanning process and transmit to the information processing device the specified scan setting information and scanned image data before the interruption to be saved in a saving unit of the information processing device, and
wherein, in a case where a job associated with the user exists in the information processing device, the image processing device further includes:
a unit configured to acquire and display job information including job identification information and scan setting information of the job on a display;
a unit configured to, in a case where the job is selected by the user from the displayed job information, execute a scanning process based on the scan setting information corresponding to the job identification information of the selected job; and
a second transmitting unit configured to transmit the job information of the selected job and the scanned image data to the information processing device to be merged with the scanned image data saved in the saving unit based on the job information,
the information processing device comprising:
a saving unit configured to receive and save the scan setting information and the scanned image data transmitted by the first transmitting unit; and
a unit configured to merge the scanned image data saved in the saving unit with the scanned image data transmitted by the second transmitting unit based on the job information of the selected job and the scanned image data transmitted by the second transmitting unit.

10. An image processing method in an image processing device of an image processing system comprising the image processing device capable of executing image reading processing and an information processing device connected to the image processing device via a network, the image processing method comprising:
executing a scanning process on a document in accordance with scan setting information specified by a user;
determining the presence or absence of an instruction to interrupt the executed scanning process; and
in a case where the presence of an instruction to interrupt the executed scanning process is determined in the determining step, interrupting the executed scanning process and transmitting the specified scan setting information and scanned image data before the interruption to the information processing device to be saved in a saving unit of the information processing device,
wherein, in a case where a job associated with the user exists in the information processing device, the image processing method further comprises:
acquiring and displaying job information including job identification information and scan setting information of the job on a display;
in a case where the job is selected by the user from the displayed job information, executing a scanning process based on the scan setting information corresponding to the job identification information of the selected job; and
transmitting the job information of the selected job and the scanned image data to the information processing device to be merged with the scanned image data saved in the saving unit based on the job information.

11. An information processing method in an image processing system comprising an image processing device capable of executing image reading processing and an information processing device connected to the image processing device via a network,
wherein the image processing device executes an image processing method comprising:
executing a scanning process on a document in accordance with scan setting information specified by a user;
determining the presence or absence of an instruction to interrupt the executed scanning process; and
in a case where the presence of an instruction to interrupt the executed scanning process is determined in the determining step, interrupting the executed scanning process and transmitting, in a first transmitting step, to the information processing device the specified scan setting information and scanned image data before the interruption to be saved in a saving unit of the information processing device, and
wherein, in a case where a job associated with the user exists in the information processing device, the image processing method further comprises:
acquiring and displaying job information including job identification information and scan setting information of the job on a display;
in a case where the job is selected by the user from the displayed job information, executing a scanning process based on the scan setting information corresponding to the job identification information of the selected job; and
transmitting, in a second transmitting step, the job information of the selected job and the scanned image data to the information processing device to be merged with the scanned image data saved in the saving unit based on the job information,
the information processing method comprising:
receiving and saving the scan setting information and the scanned image data transmitted by the first transmitting step; and
merging the scanned image data saved in the saving step with the scanned image data transmitted in the second transmitting step based on the job information of the selected job and the scanned image data transmitted in the second transmitting step.

12. A non-transitory computer-readable storage medium storing a computer program for causing a computer to perform the image processing method according to claim 10.

13. A non-transitory computer-readable storage medium storing a computer program for causing a computer to perform the information processing method according to claim 11.

* * * * *